United States Patent
Hawkins et al.

(10) Patent No.: US 7,725,428 B1
(45) Date of Patent: May 25, 2010

(54) SYSTEM AND METHOD FOR RESTORING A DATABASE IN A DISTRIBUTED DATABASE SYSTEM

(75) Inventors: Brian Hawkins, Santaquin, UT (US); Andrew Hodgkinson, Pleasant Grove, UT (US); Daniel Sanders, Orem, UT (US); Steven S. McLain, Provo, UT (US)

(73) Assignee: Novell, Inc., Provo, UT (US)

( * ) Notice: Subject to any disclaimer, the term of this patent is extended or adjusted under 35 U.S.C. 154(b) by 1636 days.

(21) Appl. No.: 10/196,923

(22) Filed: Jul. 17, 2002

Related U.S. Application Data

(60) Provisional application No. 60/364,474, filed on Mar. 14, 2002.

(51) Int. Cl.
*G06F 17/30* (2006.01)
*G06F 12/00* (2006.01)

(52) U.S. Cl. .................. 707/204; 707/200; 707/202
(58) Field of Classification Search ............... 707/202, 707/203, 204, 205
See application file for complete search history.

(56) References Cited

U.S. PATENT DOCUMENTS

| 5,381,545 | A | * | 1/1995 | Baker et al. | 714/19 |
|---|---|---|---|---|---|
| 5,446,884 | A | * | 8/1995 | Schwendemann et al. | 707/202 |
| 5,884,328 | A | * | 3/1999 | Mosher, Jr. | 707/202 |
| 5,895,493 | A | * | 4/1999 | Gatica | 707/201 |
| 6,023,710 | A | * | 2/2000 | Steiner et al. | 707/204 |
| 6,073,128 | A | * | 6/2000 | Pongracz et al. | 707/3 |
| 6,256,028 | B1 | * | 7/2001 | Sanford et al. | 715/841 |
| 6,385,626 | B1 | * | 5/2002 | Tamer et al. | 707/203 |
| 6,453,325 | B1 | * | 9/2002 | Cabrera et al. | 707/204 |

* cited by examiner

*Primary Examiner*—Baoquoc N To
(74) *Attorney, Agent, or Firm*—Haynes and Boone, LLP

(57) ABSTRACT

A system and method is presented for database restoration in a distributed data system. The distributed data system has a first database on a first server which needs restoration. The first database is first restored with a predetermined full backup file, the full backup file being made at a first predetermined time. The first database is then restored with one or more incremental backup files, the incremental backup files being made since the first predetermined time and having the most recent backup file made at a second predetermined time. A transaction log documenting data transactions since the second predetermined time is then examined. One or more transactions listed in the transaction log after the second predetermined time are then executed since they are not included in the incremental backup files. To verify whether the restored first database has completed its restoration, a transitive vector of the first database is compared with a transitive vector of a second database on a second server of the distributed database system, wherein the second database and the restored first database are expected to be the same.

17 Claims, 2 Drawing Sheets

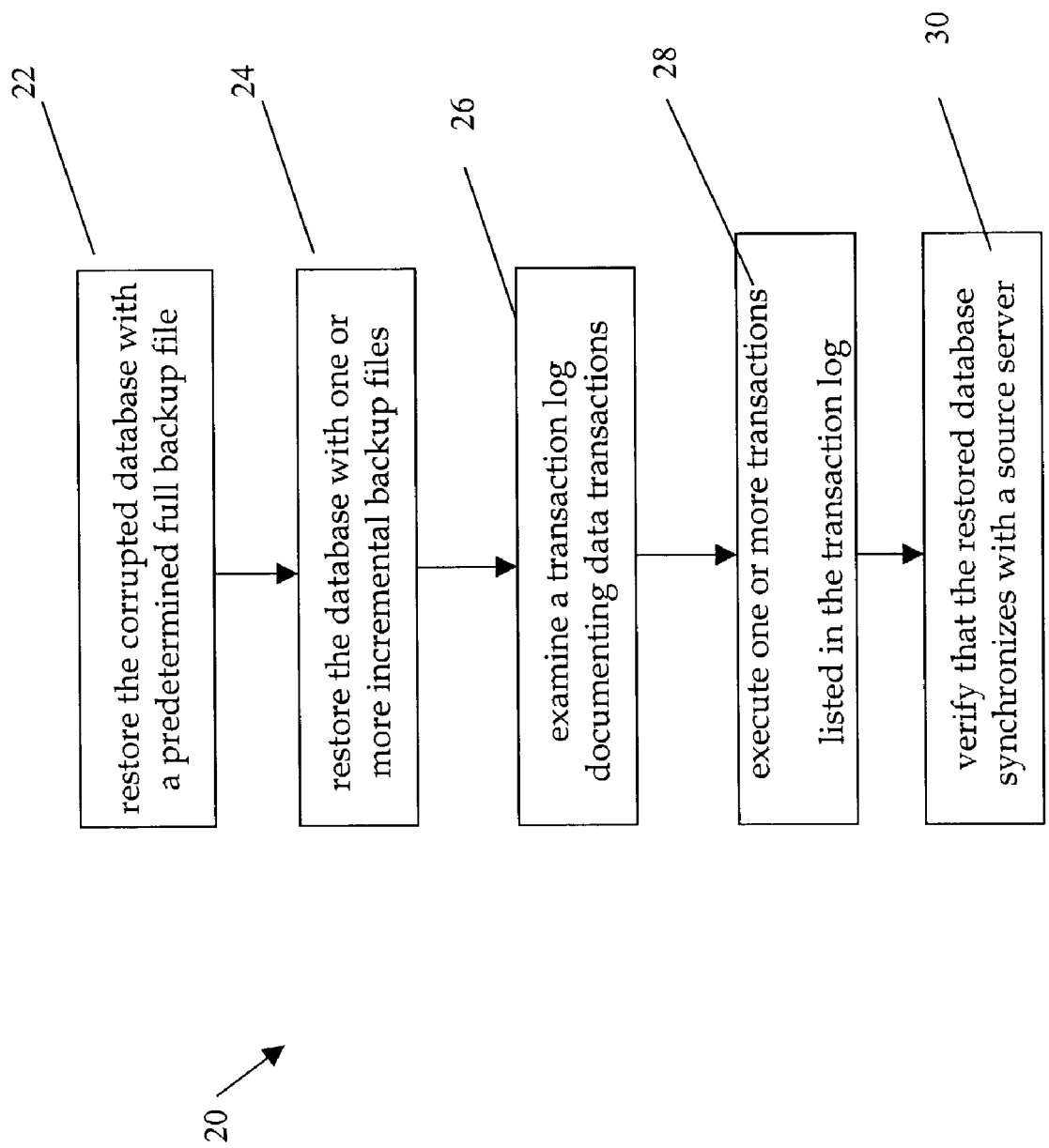

SYSTEM AND METHOD FOR RESTORING A DATABASE IN A DISTRIBUTED DATABASE SYSTEM

CROSS REFERENCE

The present disclosure claims the benefit of U.S. Provisional Patent Application Ser. No. 60/364,474, which is herein incorporated by reference in its entirety.

BACKGROUND

The present disclosure relates to object replication and, more particularly, to a system and method for restoring a database in a distributed database system.

In a distributed database system, databases on a database server are replicated and located on different servers in a distributed manner. Replication refers to a process by which data objects existing on a server are created on another server and made consistent with the originals. Various methods of replication have been proposed. One such proposal includes a store and forward method of replication in which each server keeps track of locally made changes to a particular copy of a data set (sometimes referred to as a "replica") which contains one or more data objects. Each server periodically broadcasts the new locally made changes (since the last replication broadcast) to all other related servers. Such locally made changes may include the creation of new data, modification of existing data, or deletion of existing data. The group of other servers also having a copy of the data set are kept on a "replica list." The changes are preferably broadcast in the form of updated copies of the changed data objects. This allows each server to update its local copy of the data set as changes are received by replacing the older data objects with the newer data objects.

As with any computer system, the distributed database system is vulnerable to data corruption or interruption which may leave the databases in disarray. The nature of the distributed database system is such that information may be stored on multiple servers located in multiple geographical locations. As such, data corruption on one server may affect the data integrity on multiple servers. Although it is extremely important to avoid data corruption, it is more important, when the corruption is unexpected or unavoidable, to remedy the consequence and minimize the damage caused by the data corruption by recovering the corrupted data in a complete and speedy fashion.

In the computer network, on top of the operating system layer, a cross-platform and scalable directory software system (or in short, "directory") is desirable and used for managing identities that span across the network. One example of such a directory is eDirectory provided by Novell, Inc. of Provo, Utah. Such a directory is very important for the operation of the computer network, and therefore the backup or restoration of this directory needs to be complete and in a timely fashion.

What is needed is an enhanced method and system to restore a corrupted database on a server in the distributed database system and ensure that the restored database is in synchronization with other databases of the distributed database system.

SUMMARY

In response to the need stated above, a system and method is disclosed for database restoration in a distributed data system. The distributed data system has a first database on a first server which needs restoration. The first database is first restored with a predetermined full backup file, the full backup file being made at a first predetermined time. The first database is then restored with one or more incremental backup files, the incremental backup files being made since the first predetermined time and having the most recent backup file made at a second predetermined time. A transaction log documenting data transactions since the second predetermined time is then examined. One or more transactions listed in the transaction log after the second predetermined time are then executed since they are not included in the incremental backup files. By examining at least one transitive vector (or a local synchronization vector) stored on the first server against corresponding transitive vector stored on a second server, the restored first database is verified to determine whether it has synchronized with a second database on the second server of the distributed database system, wherein the second database on the second server is expected to be synchronized with the first database on the first server.

BRIEF DESCRIPTION OF THE DRAWINGS

FIG. 2 depicts a flow diagram for restoring a corrupted database on a server according to the present disclosure.

DETAILED DESCRIPTION

Figure 1:
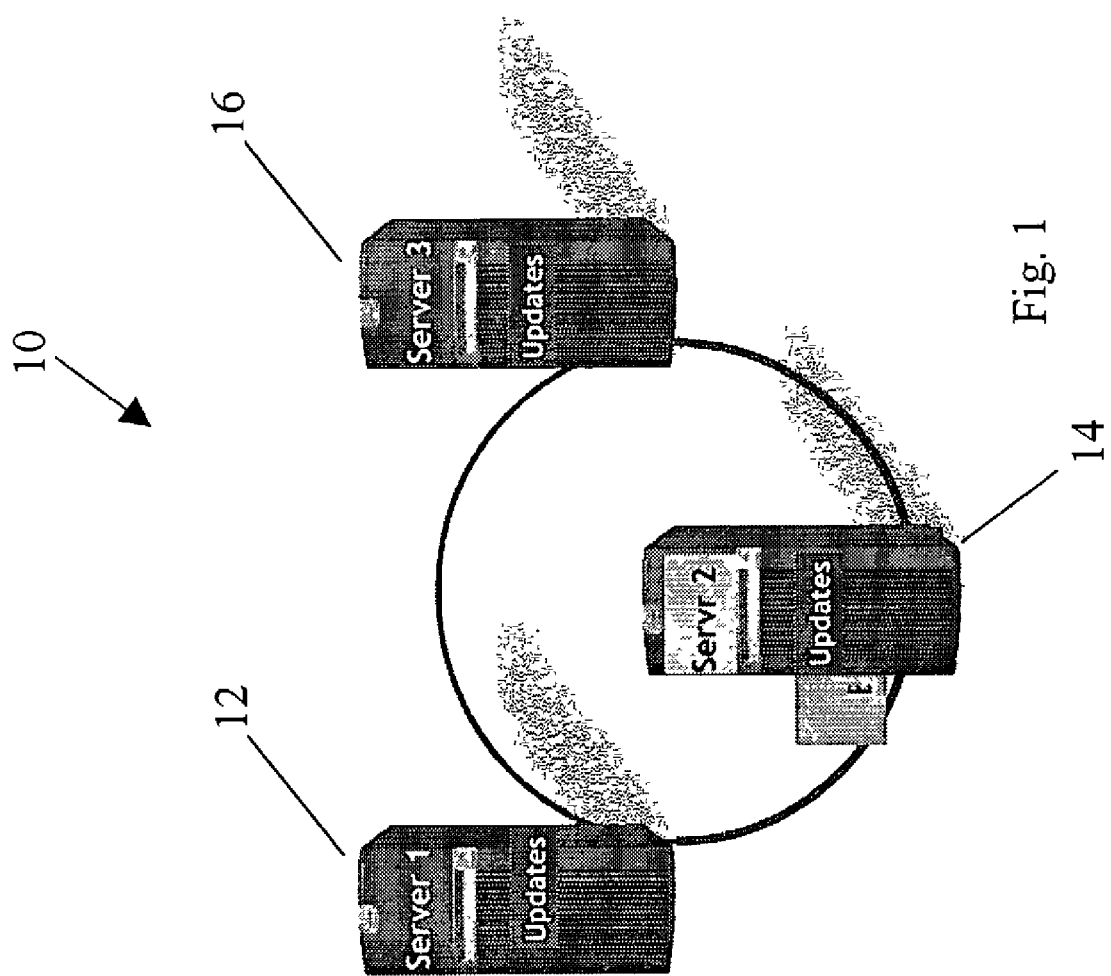
FIG. 1 depicts a diagrammatic view of a network including servers involved in data replication.

For the purposes of the present disclosure, various definitions for specific terms used are listed below. Also, in many places the present disclosure describes the restoration process using objects as the subject matter thereof, it is understood that any other data items larger than objects such as directories, or smaller than objects such as attributes of the objects are also involved in the synchronization or restoration process.

Source Server—A server from which changes to objects/databases are initially generated.

Objects—Data units existing on various servers.

Partition—A distinct portion of a directory tree of a database system that stores and replicates directory information.

Replica—A single instance of a partition or a database portion.

Replica Server—A server to which objects/data are replicated from a source server.

Replication—A process by which copies of data (e.g., objects in a database system) existing on a server are created on other servers in the network.

Replication Set—Multiple objects replicated from a single source server to any number of replica servers.

Transaction Log—A log that contains file and directory events or update transactions such as adding, modifying, deleting data.

In view of today's large scale computer networks, and their distributed architecture, restoration of corrupted data objects are complex but important. In this disclosure, any data elements, objects, directories, partitions, etc. stored on a server are generally referred to as a database. It should be understood that, for simplicity purposes, the following example may explain the method and system of the present disclosure in the context of only two servers for database replication, but the same replication process may be (and typically is) carried out among multiple servers.

FIG. 1 depicts a distributed database system 10 that includes a plurality of distributed servers (12-16) engaging in a data synchronization process. In the context of database systems such as a distributed directory system, data synchronization is a complex process in which distributed data such as files and documents are kept up-to-date so that users on each server can be sure that they are accessing the most recent version thereof. When a source server such as Server 1 and its replica servers (e.g., Servers 2 and 3) are synchronized, the contents of a transaction log file are used to identify those objects or files that have been changed, removed, or added. It is also understood that Server 1 can be the replica server for some other database originated from Server 2 or Server 3.

Various changes to a database on the source and replica servers will be recognized and applied during a synchronization process. These changes include the modification of object contents, attributes, directory attributes, access rights, additions, deletions, renaming, or moving of database elements such as objects, files or directories. During the synchronization, the modification time of the objects on the source and replica servers are set to the same value. That is, a time stamp is used to identify the time the synchronization between the source and replica servers is done. Similarly, if more than one replica server is involved, all related databases on the replica servers should have the same time stamp.

When any of the database on any one of the servers is corrupted due to an unforeseeable reason, the corrupted database needs to be resurrected as quick as possible to match the content of the database right before the corruption occurred. Anticipating that each computer is likely to fail at any time, multiple backup mechanisms have been put in place to help database recovery. For example, the server may keep a full backup file from time to time, and the server may also keep incremental backup files in addition to the full backup files.

FIG. 2 depicts a flow diagram 20 for restoring a corrupted database on a server according to the present disclosure. It is assumed that the distributed data system 10 (FIG. 1) has a first database on Server 1 which needs database restoration due to various reasons such as a file corruption or a disk drive failure, etc. It is assumed that each database on each server has a full backup file that has been created and stored on a separate disk drive of the server (assuming the server has multiple disk drives). It is understood that the full backup file is created periodically to maintain a full version of the database from time to time. Therefore, each full backup file has a time stamp so that administrators of the server can identify easily when the last (or the most recent) full backup file was made. When a database restoration is needed, the first database on Server 1 is restored with the most recent full backup file (step 22). This step ensures that the restoration process starts from a full version of the database as close as possible to the time the database is corrupted. The information about the full backup can be found in a backup log file such as the one shown below:

```
|================= DSBackup Log ================|
Begin backup of \ T=BH_TREE\O=novell\CN=TAPESRV at 2001-8-16T21:58:57GMT
Current Roll Forward Log: 0000000A.log
Backup ID: 3B7C4221
DS version 8601
Backing up file: sys:/system/autoexec.ncf
Backing up file: sys:system/nici/xmgrcfg.ks1
Backing up file: sys:system/nici/xarchive.000
Backing up file: sys:system/nici/nicisdi.key
Backing up file: sys:__netware/xmgrcfg.ks0
Backing up file: sys:__netware/xmgrseed.inf
Backing up file: sys:__netware/xmgrcfg.inf
Backing up the Directory . . .
Backup Completed Successfully.
```

This backup log file can be appended continuously with each backup operation so that a record of all backup operations is clearly maintained. From the sample backup log file shown above, the first four lines indicate basic backup information such as basic information about servers, time, transaction log file, database version, and the backup ID. This helps to locate a corresponding full backup file because the full backup file should match the exact same basic information. Also shown above is a list of all files of the database that have been included in the full backup operation. This backup log file also indicates whether the entire backup operation is a successful one (which is displayed on the last line).

The full backup file may also contain certain header information with regard to the backup operation. An example is shown below:

```
<!ELEMENT dsbackup (file*)>
<!ELEMENT file (#PCDATA)>
<!ATTLIST dsbackup version CDATA #REQUIRED>
<!ATTLIST dsbackup backup_type (full | incremental)
    #REQUIRED>
<!ATTLIST dsbackup idtag CDATA #REQUIRED>
<!ATTLIST dsbackup time CDATA #REQUIRED>
<!ATTLIST dsbackup srvname CDATA #REQUIRED>
<!ATTLIST dsbackup dsversion CDATA #REQUIRED>
<!ATTLIST dsbackup compression CDATA "none">
<!ATTLIST dsbackup os CDATA #REQUIRED>
<!ATTLIST    dsbackup    current_log    CDATA
    #REQUIRED>
<!ATTLIST    dsbackup    number_of_files    CDATA
    #IMPLIED>
<!ATTLIST    dsbackup    backup_file    CDATA
    #REQUIRED>
<!ATTLIST file size CDATA #REQUIRED>
<!ATTLIST file name CDATA #REQUIRED>
<!ATTLIST file encoding CDATA "base64">
<!ATTLIST file type (user|nici) #REQUIRED>
``` wherein various identifiers used in the header are explained below:

dsbackup version: the version of the file.

dsbackup backup_type: the type of backup being performed (full or incremental).

dsbackup idtag: an identifier based on the time of the backup operation.

dsbackup time: the time at which the backup operation started.

dsbackup srvname: domain name of the server being backed up.

dsbackup dsversion: the version of eDirectory running on the server.

dsbackup compression: compression used on the backup data (the header information may not be compressed).

dsbackup os: the operating system on which the backup was performed.

dsbackup current_log: this is the first log/tile that is required when restoring this backup.

dsbackup number_of_files: this is the number of files in the backup set.

dsbackup backup_file: the filename of the current backup.

file size: the size of the data.

file encoding: indication of encoding algorithms used on the file.

file type: indication of the file type for the backed up information.

In addition to the full backup file, each server may also store one or more incremental backup files. These files represent transactions made since the last full or incremental backup operations. Referring to FIG. 2, in step 24, the necessary incremental backup files made since the most recent full backup operation are identified and the first database is restored with all such incremental backup files. Since each incremental backup file also contains a time stamp for the time it was created, it is possible to determine the time difference from the time when the most recent transaction having an incremental backup file was done to the time the database was corrupted.

As stated above, the server also maintains a transaction log documenting various data transactions. In the industry where database systems are produced by different companies, this transaction log may have different names. For example, for the eDirectory, this may be referred to as a Roll Forward Log. By examining the transaction log in step 26, the transactions that have been executed, but not found within any incremental backup file, are then executed again in step 28. In some situations, there may be multiple transaction logs, the restoration process should read all relevant transaction logs to make sure that none of the transactions are missed. After this is done, Server 1 has actively restored all the elements of the corrupted first database up to a state that is in synchronization with the state of the database immediately after the last transaction recorded by the server was executed.

Due to the nature of the distributed database system, it must be verified that the restored first database is in synchronization with all other related servers such as Servers 2 and 3, assuming both of which have interactions with Server 1 for sending or receiving replicas of certain databases. Assuming Server 2 has sent a replica of a second database to Server 1 in the past, Server 1 is thus deemed as a replica server of Server 2. In this sample distributed system comprising simply Servers 1, 2, and 3, each server maintains at least one transitive vector representing the state of each database on other servers. A transitive vector of a server may comprise at least one timestamp of at least one replica of the server, for example. These transitive vectors are used as a benchmark to measure whether the once failed database has been fully restored. For example, in step 30, Server 2 is contacted by Server 1, and a transitive vector or local synchronization vector for each replica (containing information about the state of synchronization on the local server such as the "local-received-up-to vector" (LRUT) for eDirectory) on Server 1 is compared to a corresponding transitive vector stored on the Server 2 which indicates the state of the respective replica. A discrepancy between them will indicate that certain data replicas may need to be generated again in order to keep these two servers synchronized. If there is no discrepancy, the restored first database is now ready to be opened for use. In other words, only when the transitive vector on the restored Server 1 matches its corresponding transitive vectors on Server 2 and 3, Server 1 is deemed to be fully restored. It is understood that while restoring a database, the database may be constructed under a different or temporary name (other than the name represent the corrupted database). When the restoration is complete, the restored database can be renamed to the original name of the database.

During the restoration process of Server 1, the database undergoing the restoration process must not be accidentally opened up for use. If the corrupted database is replicated to other servers, it will infect the integrity of other servers that are in communication with Server 1. Therefore, when the first database is being restored, it is logically locked so that it cannot spread the corrupted data around.

In the context of restoring a directory such as eDirectory, the present disclosure provides a method and system to ensure the fullest recovery possible for any distributed server, and to match synchronization states of other related source or replica servers. In addition, the transaction logs may be placed on a separate storage drive system other than where the restored data is. Since the transaction logs may also contain sensitive information, the access of which may be tightly controlled. The size of the transaction log may be monitored as the log grows longer and longer. For example, a new log can be created after the old one reaches a certain size.

It is understood that variations may be made in the foregoing without departing from the scope of the present invention. It is further understood that other modifications, changes and substitutions are intended in the foregoing disclosure and in some instances some features of the disclosure will be employed without corresponding use of other features. Additionally, singular discussion of items and/or servers located in the network is also meant to apply to situations where multiple items and/or servers exist. For example, a source server can be a destination server at the same time due to replication requests made by other servers in the network. Accordingly, it is appropriate that the appended claims be construed broadly and in a manner consistent with the scope of the disclosure.

What is claimed is:

1. A method for database restoration in a distributed data system, the distributed data system having a first database on a first server which needs database restoration, the method comprising:
   restoring the first database according to a predetermined full backup file, the full backup file being made at a first predetermined time;
   restoring the first database with one or more incremental backup files, the incremental backup files being made since the first predetermined time and having a most recent incremental backup file of the one or more incremental backup files made at a second predetermined time;
   examining a transaction log documenting data transactions since the second predetermined time;
   executing, on the first database, one or more transactions listed in the transaction log after the second predetermined time; and
   verifying whether the first database has completed its restoration by comparing a first transitive vector maintained in association with the first database with a second transitive vector associated with the first database, wherein the first transitive vector is maintained by a first server hosting the first database and the second transitive vector is maintained by a second server hosting the second database, and wherein the first database and the second database are synchronized if the first and second transitive vectors are the same.

2. The method of claim 1 wherein the full backup file is stored in a separate storage instrument of the first server other than one used to store the first database.

3. The method of claim 1 wherein the full backup file contains identification information to locate at least one corresponding transaction log.

4. The method of claim 1 further comprising prohibiting the first server to exchange information with any other server while restoring the first database.

5. The method of claim 1, wherein the first transitive vector includes a state of the first database, and wherein the second transitive vector includes a state of the first database.

6. The method of claim 5, wherein the step of verifying includes examining at least one transitive vector stored on the second server with a local synchronization vector stored on the first server.

7. The method of claim 5, further including synchronizing the first database with the second database by generating replicas of the second database in the first database.

8. The method of claim 5, further comprising assuring that the second server is operating before restoring the first database.

9. A system for restoring a first database, the system comprising:
- a first server having a predetermined full backup file made from the first database at a first predetermined time and used for restoring the first database up to the first predetermined time;
- one or more incremental backup files made since the first predetermined time and having a most recent incremental backup file of the one or more incremental backup files made at a second predetermined time; and
- a transaction log documenting data transactions since the second predetermined time,
- wherein the full backup file, the one or more incremental backup files, and the transaction log are stored on one or more storage devices of the first server,
- wherein the first database is restored by copying the full backup file and the one or more incremental backup files, and executing, on the first database, one or more transactions listed in the transaction log after the second predetermined; and
- a second server hosting a second database,
- wherein verification of whether the first database has completed its restoration is made by comparing a first transitive vector maintained in association with the first database with a second transitive vector associated with the first database, wherein the first transitive vector is maintained by the first server hosting the first database and the second transitive vector is maintained by the second server hosting the second database, and wherein the first database and the second database are confirmed as synchronized if the first and second transitive vectors are the same.

10. The system of claim 9 wherein the full backup file is stored in a separate storage instrument of the first server other than one used to store the first database.

11. The system of claim 9 wherein the full backup file contains identification information to locate at least one corresponding transaction log.

12. The system of claim 9 further comprising means for prohibiting the first server to exchange information with any other server while restoring the first database.

13. The system of claim 9, wherein the first transitive vector includes a state of the first database, and wherein the second transitive vector includes a state of the first database.

14. The system of claim 13, further comprising means for synchronizing the first database with the second database by generating replicas of the second database in the first database.

15. The system of claim 13, further comprising means for assuring that the second server is operating before restoring the first database.

16. A method for database restoration in a distributed data system, the distributed data system having a first database on a first server which needs database restoration, the method comprising:
- assuring the first server and a second server are operating, the second server having exchanged data with the first server;
- prohibiting the first server to exchange data with any other server while restoring the first database;
- starting to restore the first database according to a predetermined full backup file, the full backup file being made at a first predetermined time;
- restoring the first database with one or more incremental backup files, the incremental backup files being made since the first predetermined time and including a most recent incremental backup file made at a second predetermined time;
- examining a transaction log documenting data transactions since the second predetermined time, the transaction log containing identification information to locate the full backup file;
- executing, on the first database, one or more transactions listed in the transaction log after the second predetermined time; and
- verifying whether the first database has completed its restoration by comparing a first transitive vector maintained in association with the first database with a second transitive vector associated with the first database, wherein the first transitive vector is maintained by a first server hosting the first database and the second transitive vector is maintained by a second server hosting the second database, and wherein the first database and the second database are synchronized if the first and second transitive vectors are the same.

17. The method of claim 16, wherein the first transitive vector includes a state of the first database, and wherein the second transitive vector includes a state of the first database.

* * * * *